US012651142B2

(12) United States Patent
Zhu et al.

(10) Patent No.: US 12,651,142 B2
(45) Date of Patent: Jun. 9, 2026

(54) NETWORK-BASED ARTIFICIAL INTELLIGENCE (AI) MODEL CONFIGURATION

(71) Applicant: QUALCOMM Incorporated, San Diego, CA (US)

(72) Inventors: Xipeng Zhu, San Diego, CA (US); Gavin Bernard Horn, La Jolla, CA (US); Rajat Prakash, San Diego, CA (US); Rajeev Kumar, San Diego, CA (US); Shankar Krishnan, San Diego, CA (US); Taesang Yoo, San Diego, CA (US); Eren Balevi, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1294 days.

(21) Appl. No.: 17/484,580

(22) Filed: Sep. 24, 2021

(65) Prior Publication Data

US 2023/0100253 A1 Mar. 30, 2023

(51) Int. Cl.
H04W 4/50 (2018.01)
G06N 3/04 (2023.01)
H04W 24/02 (2009.01)

(52) U.S. Cl.
CPC .............. G06N 3/04 (2013.01); H04W 24/02 (2013.01)

(58) Field of Classification Search
CPC ..... H04W 16/14; H04W 24/02; H04W 88/06; H04W 48/18; H04W 8/24; H04W 92/10;

H04W 12/02; H04W 12/033; H04W 12/102; H04W 24/10; H04W 36/00; H04W 36/14; H04W 4/06; H04W 64/00;
(Continued)

(56) References Cited

U.S. PATENT DOCUMENTS

2019/0156247 A1* 5/2019 Faulhaber, Jr. ........ G06N 20/00
2021/0182658 A1* 6/2021 Wang ....................... G06N 3/02
(Continued)

FOREIGN PATENT DOCUMENTS

| WO | WO-2020171803 A1 * | 8/2020 | ............. G06N 3/092 |
| WO | 2021048600 A1 | 3/2021 | |
| WO | WO-2021238397 A1 * | 12/2021 | ............. G06N 3/098 |

OTHER PUBLICATIONS

Moderator (Qualcomm): "Moderator's Summary for Discussion [RAN93e-R18Prep-12] AI/ML", 3GPP TSG RAN#93e, RP-211662, 3rd Generation Partnership Project (3GPP), RAN WG3, Electronic Meeting, Sep. 13-17, 2021, 89 Pages.
(Continued)

*Primary Examiner* — Quan M Hua
(74) *Attorney, Agent, or Firm* — Seyfarth Shaw LLP

(57) ABSTRACT

A method of wireless communication by a base station includes receiving a user equipment (UE) radio capability and a UE machine learning capability. The method also includes determining a neural network function (NNF) based on the UE radio capability. The method includes determining a neural network model. The neural network model includes a model structure and a parameter set, based on the NNF, the UE machine learning capability, and a capability of a network entity. The method also includes configuring the network entity with the neural network model.

25 Claims, 16 Drawing Sheets

(58) Field of Classification Search
CPC ..... H04W 72/04; H04W 72/12; H04W 72/23;
H04W 76/12; H04W 76/15; H04W 76/30;
H04W 8/08; H04W 84/04; H04L 5/00;
H04L 25/02; H04L 12/18; H04L 25/03;
H04L 41/16; H04L 41/5009
See application file for complete search history.

(56) References Cited

U.S. PATENT DOCUMENTS

| | | | | |
|---|---|---|---|---|
| 2021/0385682 | A1* | 12/2021 | Bedekar ............ | H04W 28/0215 |
| 2022/0159528 | A1* | 5/2022 | Tran ...................... | H04L 5/0035 |
| 2022/0368570 | A1* | 11/2022 | Lee ..................... | H04L 25/0254 |

OTHER PUBLICATIONS

Partial International Search Report—PCT/US2022/041713—ISA/
EPO—Nov. 24, 2022.
International Search Report and Written Opinion—PCT/US2022/
041713—ISA/EPO—Jan. 24, 2023.

* cited by examiner

550

INPUT DATA — 552

554A

CONV — 556

LNorm — 558

MAX POOL — 560

554B

CONV — 556

LNorm — 558

MAX POOL — 560

FC1 — 562

FC2 — 562

LR — 564

CLASSIFICATION SCORE — 566

Neural network function (NNF)
Y = F(X)

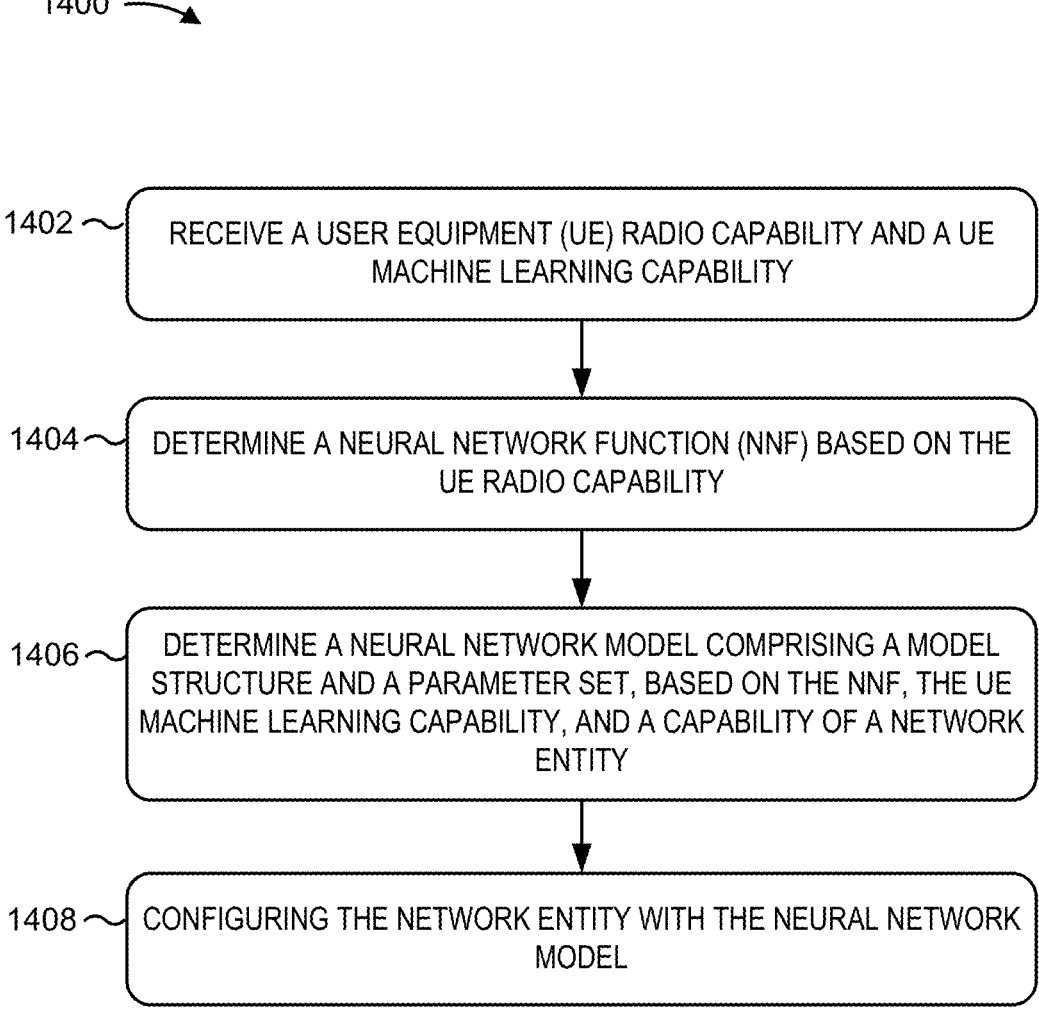

1400

1402 — RECEIVE A USER EQUIPMENT (UE) RADIO CAPABILITY AND A UE MACHINE LEARNING CAPABILITY

1404 — DETERMINE A NEURAL NETWORK FUNCTION (NNF) BASED ON THE UE RADIO CAPABILITY

1406 — DETERMINE A NEURAL NETWORK MODEL COMPRISING A MODEL STRUCTURE AND A PARAMETER SET, BASED ON THE NNF, THE UE MACHINE LEARNING CAPABILITY, AND A CAPABILITY OF A NETWORK ENTITY

1408 — CONFIGURING THE NETWORK ENTITY WITH THE NEURAL NETWORK MODEL

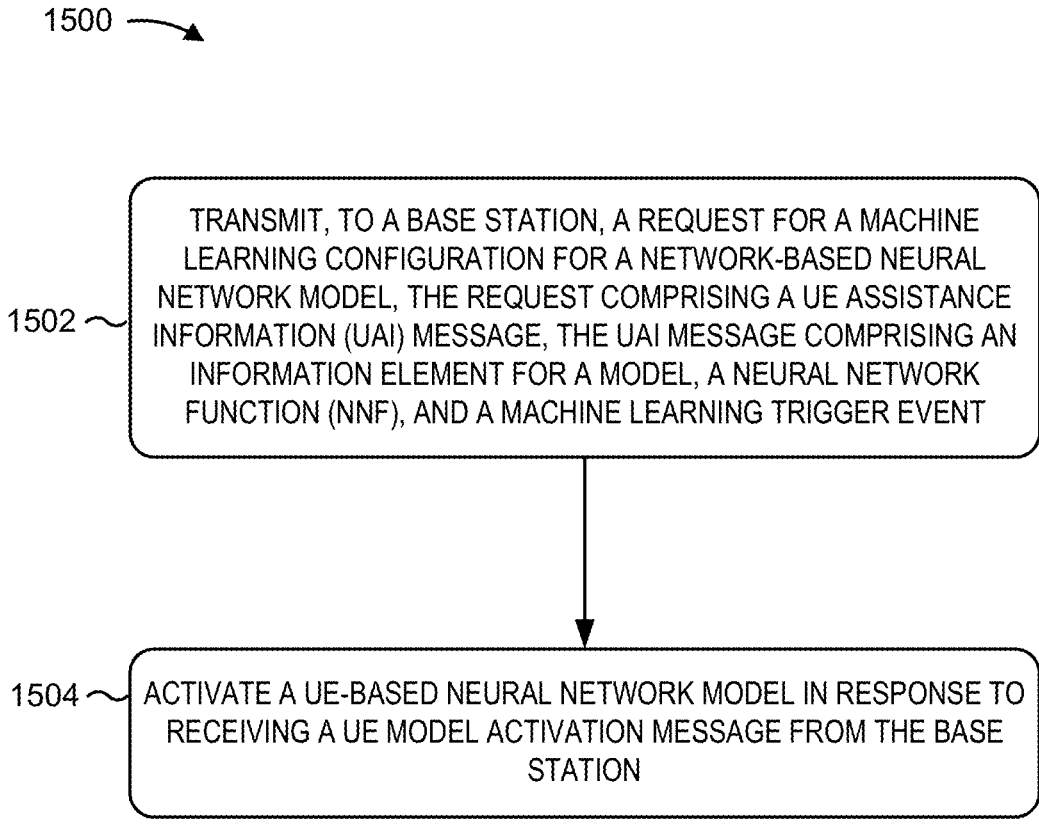

1502 ⟶ TRANSMIT, TO A BASE STATION, A REQUEST FOR A MACHINE LEARNING CONFIGURATION FOR A NETWORK-BASED NEURAL NETWORK MODEL, THE REQUEST COMPRISING A UE ASSISTANCE INFORMATION (UAI) MESSAGE, THE UAI MESSAGE COMPRISING AN INFORMATION ELEMENT FOR A MODEL, A NEURAL NETWORK FUNCTION (NNF), AND A MACHINE LEARNING TRIGGER EVENT

1504 ⟶ ACTIVATE A UE-BASED NEURAL NETWORK MODEL IN RESPONSE TO RECEIVING A UE MODEL ACTIVATION MESSAGE FROM THE BASE STATION

*FIG. 15*

NETWORK-BASED ARTIFICIAL INTELLIGENCE (AI) MODEL CONFIGURATION

FIELD OF THE DISCLOSURE

The present disclosure relates generally to wireless communications, and more specifically to configuration of a network-based artificial intelligence or machine learning (AI/ML) model.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a base station includes receiving a user equipment (UE) radio capability and a UE machine learning capability. The method also includes determining a neural network function (NNF) based on the UE radio capability. The method also includes determining a neural network model. The neural network model includes a model structure and a parameter set, based on the NNF, the UE machine learning capability, and a capability of a network entity. The method includes configuring the network entity with the neural network model.

In other aspects of the present disclosure, a method of wireless communication by a user equipment (UE) includes transmitting, to a base station, a request for a machine learning configuration for a network-based neural network model. The request has a UE assistance information (UAI) message, which has an information element for a model, a neural network function (NNF), and a machine learning trigger event. The method further includes activating a UE-based neural network model in response to receiving a UE model activation message from the base station.

Other aspects of the present disclosure are directed to an apparatus for wireless communication by a base station having a memory and one or more processor(s) coupled to the memory. The processor(s) is configured to receive a user equipment (UE) radio capability and a UE machine learning capability. The processor(s) is also configured to determine a neural network function (NNF) based on the UE radio capability. The processor(s) is also configured to determine a neural network model, which has a model structure and a parameter set, based on the NNF, the UE machine learning capability, and a capability of a network entity. The processor(s) is further configured to configure the network entity with the neural network model.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 14 is a flow diagram illustrating an example process performed, for example, by a base station in accordance with various aspects of the present disclosure.

FIG. 15 is a flow diagram illustrating an example process performed, for example, by a user equipment (UE), in accordance with various aspects of the present disclosure.

DETAILED DESCRIPTION

Figure 1:
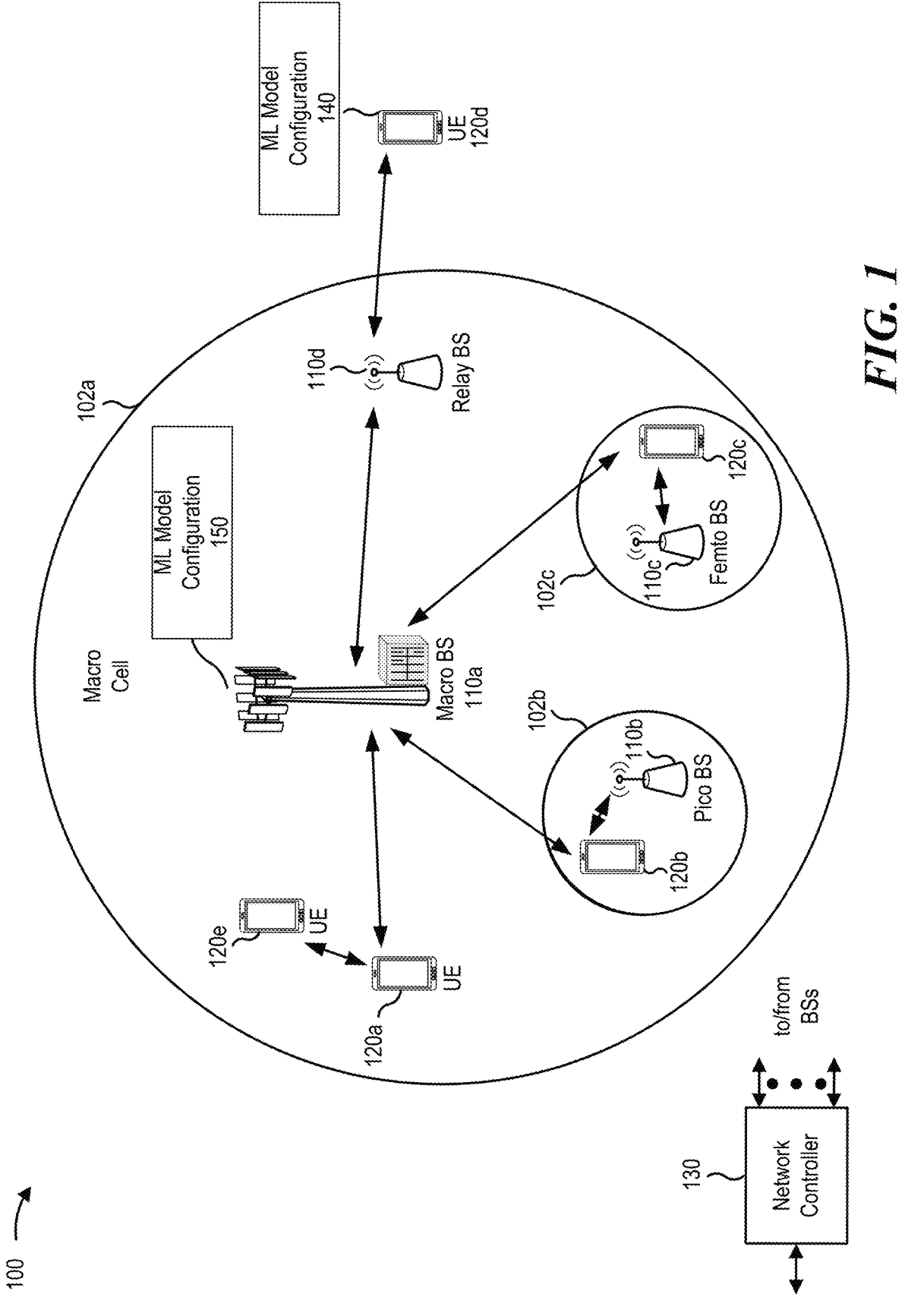
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Artificial intelligence solutions, such as machine learning implemented with neural network models may improve wireless communications. For example, machine learning may be employed to improve channel estimates, cell selection, or other wireless functions. The neural network models may run on a user equipment (UE), a network entity, or on both devices to execute one or more neural network functions (NNFs). For example, compression and decompression of channel state feedback may be implemented with neural network models running on both the UE and the network entity, which may be, for example, a base station. The neural network models may also be referred to as machine learning models, throughout this disclosure.

In some cases, it may be advantageous for a base station of a wireless communication network to dynamically configure a UE and a network entity with at least one NNF and/or one or more corresponding neural network models. This dynamic configuration may provide flexibility within the wireless communication network. For example, this dynamic configuration may allow the UE or network entity to avoid storing all possible neural network models for a particular NNF, saving storage space on the UE and network entity. Instead, the UE and/or network entity may separately download a particular neural network model when indicated to use that particular neural network model. The neural network model may include a model structure and model parameters. Additionally, dynamic configuration may provide the base station with flexibility to selectively choose, at any given time and for a particular scenario, which NNF(s) and/or corresponding model(s) to use for performing one or more machine learning-based wireless communications management procedures. Moreover, dynamic configuration may allow the base station to dynamically update neural network models for NNFs.

However, a base station is currently unable to configure a UE or network entity to use a particular NNF and/or machine learning model (e.g., to perform certain machine learning-based wireless communications management procedures). Thus, aspects of the present disclosure provide techniques to facilitate the configuration and use of NNFs and corresponding neural network models within a wireless communication network.

A neural network (NN) model may be defined as a model structure plus a parameter set. A network operator, infrastructure vendor, or third party may define the model. The model structure may be identified by a model identifier (ID), which should be unique in the network. In some aspects, the model structure includes a default parameter set. Each model ID is associated with a neural network function. The parameter set includes weights of the neural network model and other configuration parameters. The parameter set may be location or configuration specific.

According to aspects of the present disclosure, a centralized unit control plane (CU-CP) and/or centralized unit machine learning plane (CU-XP) may decide to configure a network model for inference and/or training. The configuration may be initiated either by the network or in response to a UE request. The configured model may run in a network entity, such as a distributed unit (DU), radio access network (RAN) intelligent controller (RIC), centralized unit user plane (CU-UP), centralized unit control plane (CU-CP), centralized unit machine learning plane (CU-XP), or any other network entity. If the model and parameter set are not locally cached in the running host, such as DU/RIC/CU-UP, etc., the model and parameter set will be downloaded. When the model and parameter set are ready, the CU-CP and/or CU-XP activates the model. A UE model may be configured together with the network model, for example, to compress and decompress channel state feedback.

To configure the network-based model, the CU-CP decides which NNF to use, for example, based upon a UE capabilities exchange, UE request, or some other trigger. The CU-CP transmits an ID of the determined NNF to the CU-XP in an NNF request message. The CU-XP selects a model and parameter set based on the requested NNF. The CU-XP transmits a model setup request to the RAN node that will run the model. The model setup request may include a model ID and a parameter set ID. The RAN node determines a location of the parameter set and the model by transmitting a model querying request, to a location database, such as a model and data access coordinator (MDAC). The model querying request may include the model ID and the parameter set ID. The MDAC responds with a model querying response indicating locations of the model and parameter set. The MDAC may indicate the locations with a model URL (uniform resource locator) and a parameter set URL.

After retrieving the locations, the RAN node downloads the model and parameter set from the model repository (MR). The RAN node may communicate with the MR, for example, with a user plane protocol to download the model structure and parameter set. After model configuration, activation should occur to enable use of the model. RAN side model activation may be achieved by the base station informing the inference and/or training nodes to start running the model, once the model and parameter set are ready.

In some aspects of the present disclosure, a UE triggers configuration of a network model. A UE radio capability exchange may occur between the UE and the CU-CP. A UE machine learning capability exchange may occur between the UE and the CU-XP. An event at the UE may trigger machine learning for a network-based model. In some aspects of the present disclosure, triggers for a UE machine learning (ML) request may be based on a scope of the model. That is, each artificial intelligence or machine learning (AI/ML) model may have an applicable scope. When the UE transitions into or out of the applicable scope of a model, a UE ML request may be triggered for configuration of a network model. To avoid the flooding of too many UE ML requests, the network may configure a blacklist, and/or whitelist of UE triggers. The network may also configure a prohibit timer to prevent sending of requests too frequently. The black list, prohibit timer, and/or whitelist may be configured by a radio resource control (RRC) reconfiguration message. For a neural network function (NNF) or model in neither the whitelist nor blacklist, the UE can autonomously request network configuration. In some aspects, the network only allows requesting of a model in the whitelist. After the UE capability exchange and receiving the prohibit timer, whitelist, and black list, the UE may request the network to configure machine learning functions for execution on the network.

The UE can ask the network for the machine learning (ML) configuration with a UE assistance information (UAI) message. According to aspects of the present disclosure, a machine learning assistance information element (IE) can be added into the UAI message. The machine learning assistance IE may include a machine learning request for a model or model list. The machine learning request may also indicate an NNF or NNF list request. The machine learning assistance IE may include an event indicating an applicable condition change, in other words, informing the network of what has changed for an already configured model.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a machine learning (ML) configuration module 140. For brevity, only one UE 120d is shown as including the ML configuration module 140. The ML configuration module 140 may transmit, to a base station, a request for a machine learning configuration for a network-based neural network model. The request may be in the form of a UE assistance information (UAI) message. The UAI message may have an information element for a model, a neural network function, and a machine learning trigger event. The module 140 may also activate a UE-based neural network model in response to receiving a UE model activation message from the base station.

The base stations 110 may include a machine learning (ML) configuration module 150. For brevity, only one base station 110a is shown as including the ML configuration module 150. The ML configuration module 150 may receive a user equipment (UE) radio capability and a UE machine learning capability, and determine a neural network function (NNF) based on the UE radio capability. The ML configuration module 150 may also determine a neural network model comprising a model structure and a parameter set, based on the neural network function, the UE machine learning capability and a capability of a network entity;. The module 150 may configure the network entity with the neural network model.

As indicated above, FIG. 1 is provided merely as an example. Other examples may differ from what is described with regard to FIG. 1.

Figure 2:
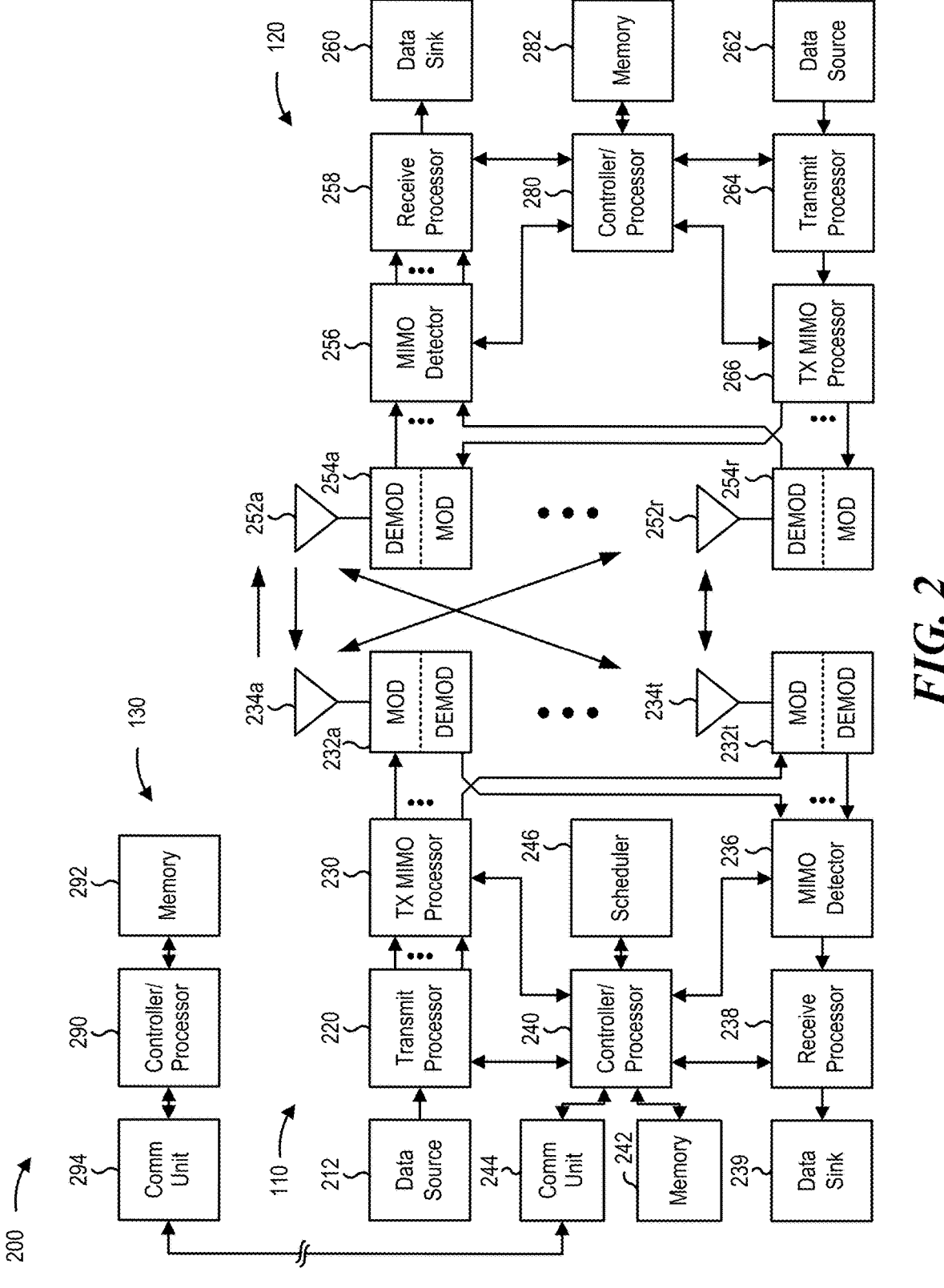
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with configuration of a network-based neural network model, as described in more detail elsewhere. For example, the controller/processor 240 of the base station 110, the controller/processor 280 of the UE 120, and/or any other component(s) of FIG. 2 may perform or direct operations of, for example, the processes of FIGS. 8-15 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for determining, means for configuring, means for transmitting, means for activating. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
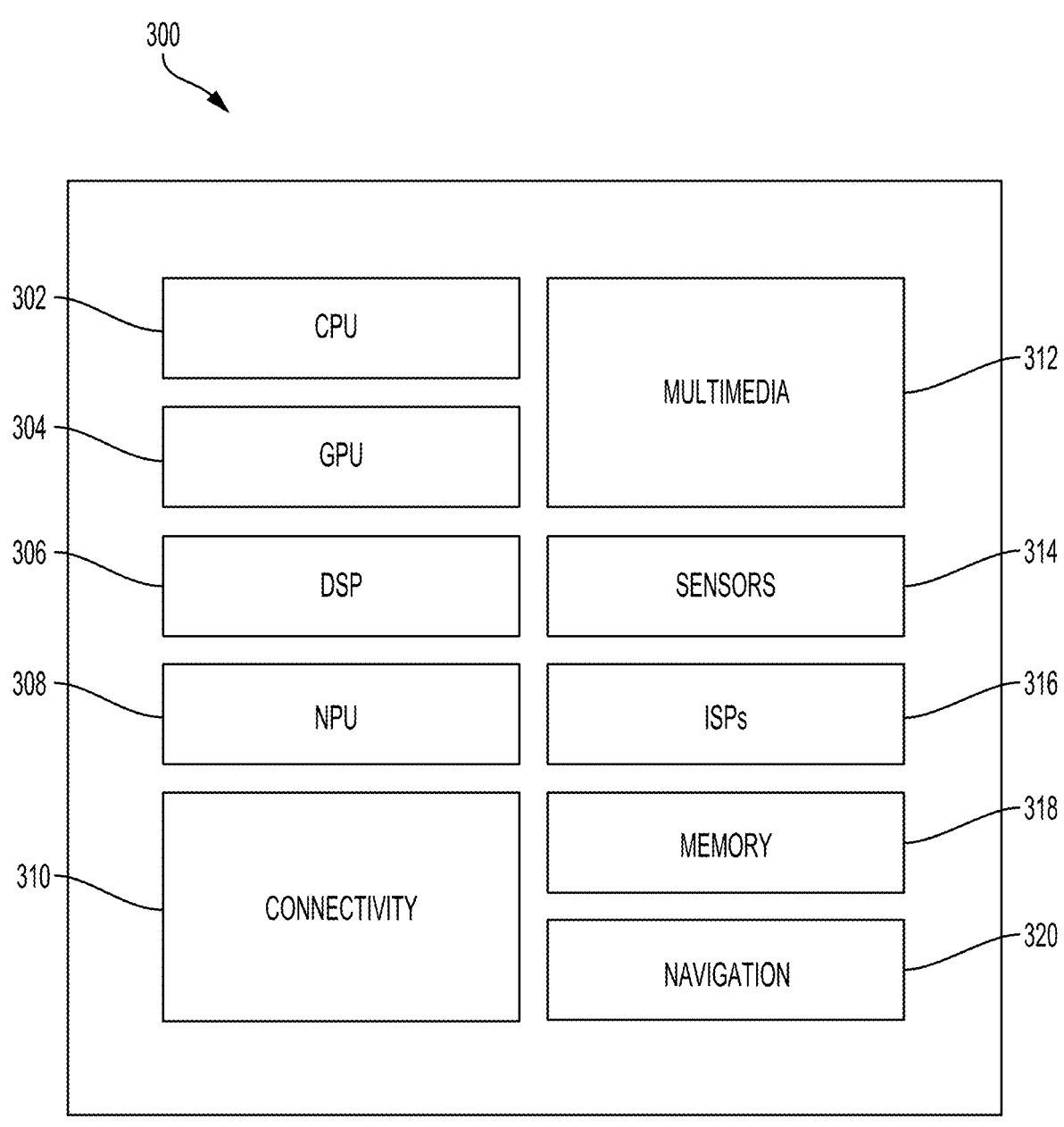
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive a user equipment (UE) radio capability and a UE machine learning capability and determine a neural network function (NNF) based on the UE radio capability. The general-purpose processor 302 may also comprise code to determine a neural network model. The neural network model includes a model structure and a parameter set, based on the NNF, the UE machine learning capability, and a capability of a network entity. The general-purpose processor 302 may also comprise code to configure the network entity with the neural network model. The general-purpose processor 302 may also comprise code to transmit, to a base station, a request for a machine learning configuration for a network-based neural network model. The request comprises a UE assistance information (UAI) message, which has an information element for a model, a neural network function (NNF), and a machine learning trigger event. The general-purpose processor 302 may further comprise code to activate a UE-based neural network model in response to receiving a UE model activation message from the base station.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
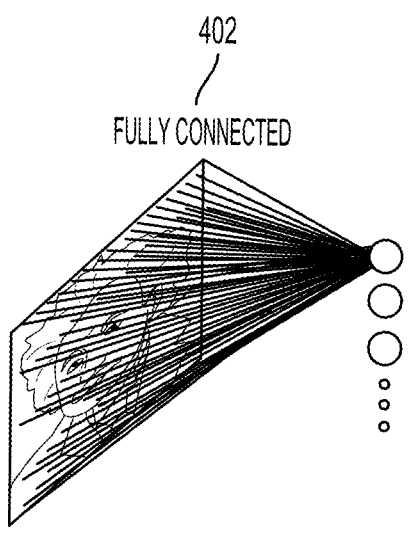
FIGS. 4A, 4B, and 4C are diagrams illustrating a neural network, in accordance with aspects of the present disclosure.
Figure 4B:
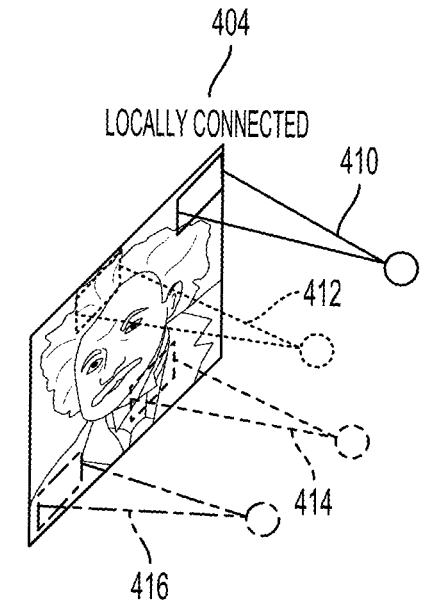

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
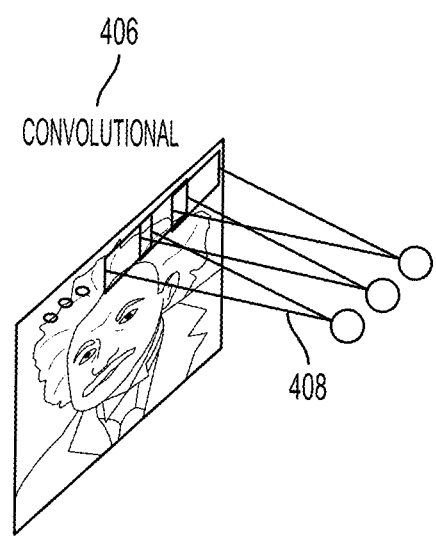

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
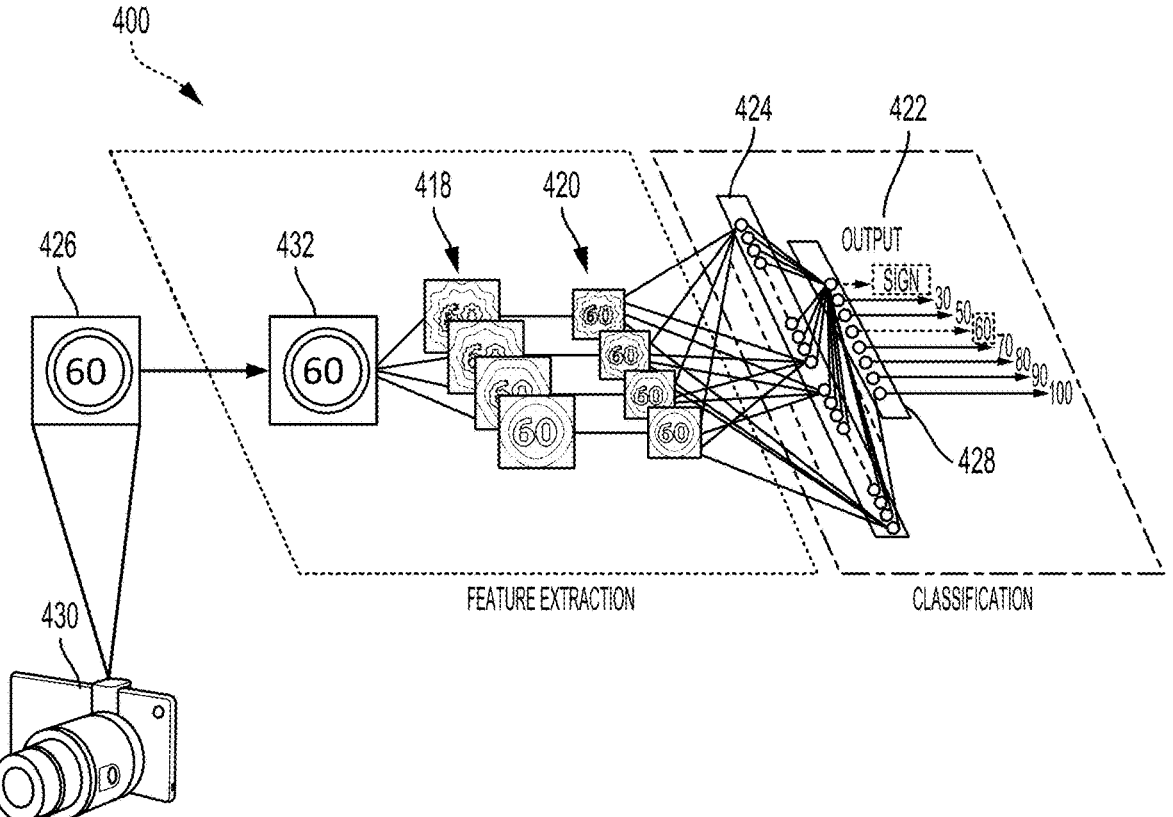
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
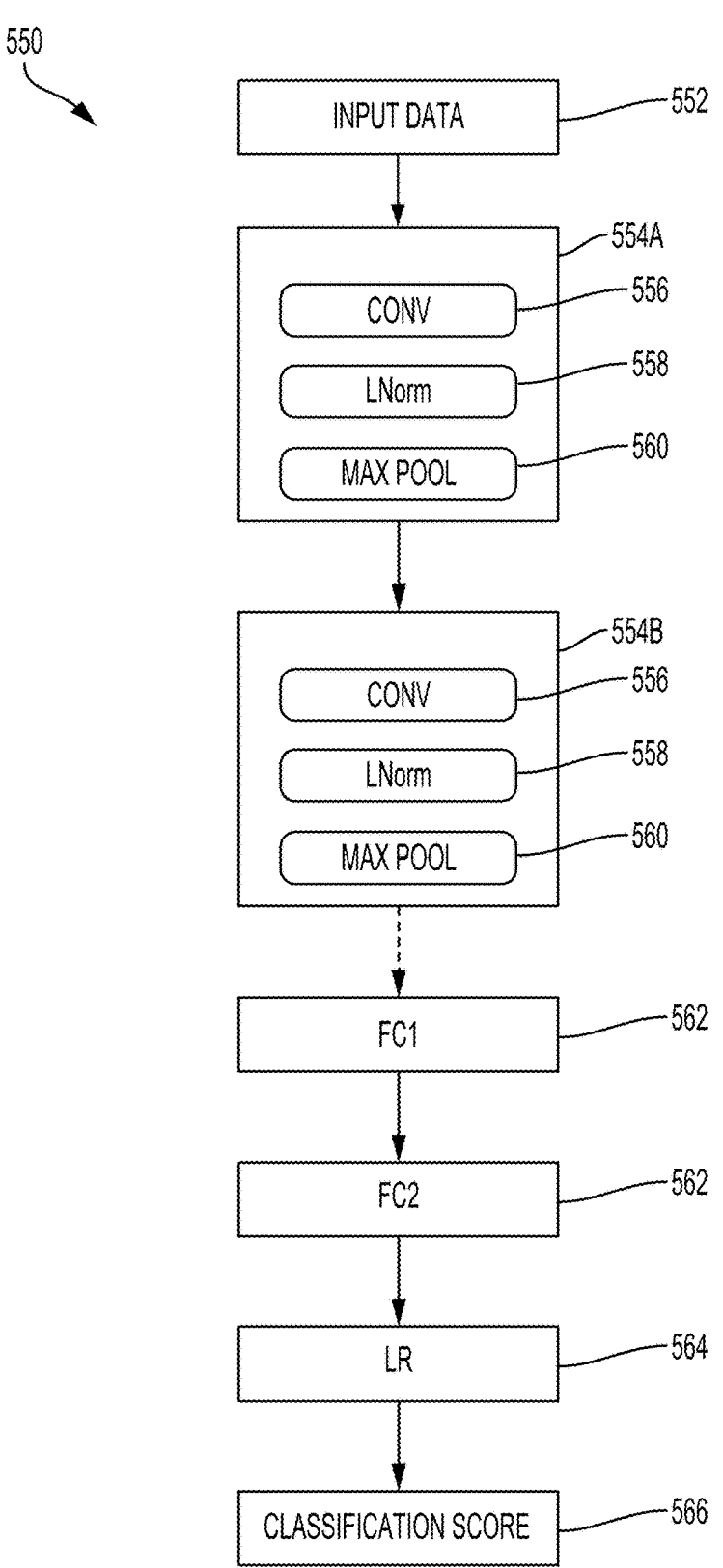
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Artificial intelligence solutions, such as machine learning implemented with neural network models may improve wireless communications. For example, machine learning may be employed to improve channel estimates, cell selection, or other wireless functions. The neural network models may run on the UE, a network entity, or on both devices together to execute one or more neural network functions (NNFs). For example, compression and decompression of channel state feedback may be implemented with neural network models running on both the UE and the network entity, which may be, for example a base station. The neural network models may also be referred to as machine learning models, throughout this disclosure.

In some cases, it may be advantageous for a base station of a wireless communication network to dynamically configure a UE and a network entity with at least one NNF and/or one or more corresponding neural network models. This dynamic configuration may provide flexibility within the wireless communication network. For example, this dynamic configuration may allow the UE or network entity to avoid storing all possible neural network models for a particular NNF, saving storage space on the UE and network entity. Instead, the UE and/or network entity may separately download a particular neural network model when indicated to use that particular neural network model. The neural network model may include a model structure and model parameters. Additionally, dynamic configuration may provide the base station with flexibility to selectively choose, at any given time and for a particular scenario, which NNF(s) and/or corresponding model(s) to use for performing one or more machine learning-based wireless communications management procedures. Moreover, dynamic configuration may allow the base station to dynamically update neural network models for NNFs.

However, a base station is currently unable to configure a UE or network entity to use a particular NNF and/or machine learning model (e.g., to perform certain machine learning-based wireless communications management procedures). Thus, aspects of the present disclosure provide techniques to facilitate the configuration and use of NNFs and corresponding neural network models within a wireless communication network.

A neural network function (NNF) may be defined as a function Y=F(X) to be supported by a neural network model. Many different models may support any particular NNF. For example, vendor-specific models or standardized models may implement an NNF. Different NNFs may correspond to different machine learning-based wireless communications management procedures. Examples of these machine learning-based wireless communications management procedures may include cell reselection procedures, idle or inactive mode measurement procedures, radio resource management (RRM) measurement procedures, channel state feedback, compression, and the like. Each different NNF may be identified by an NNF identifier (ID), which corresponds to a particular machine learning (ML)-based wireless communications management procedure.

Each neural network function (NNF) is identified by a standardized NNF ID. Non-standardized NNF IDs are also allowed for private extensions. The input X and output Y may be standardized for each NNF. Some information elements (IEs) may be mandatory for inter-vendor interworking, whereas other IEs may be optional for a flexible implementation.

Figure 6:
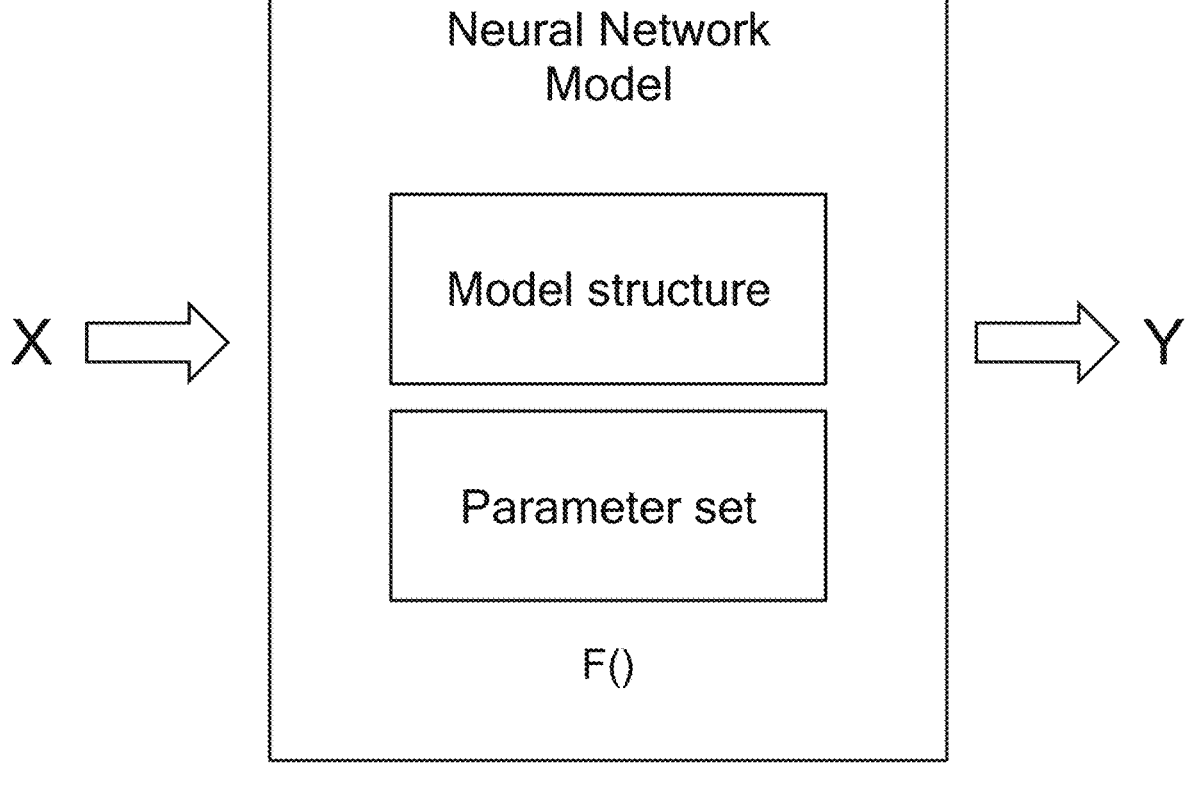
FIG. 6 is a block diagram illustrating an exemplary neural network model, in accordance with aspects of the present disclosure.

FIG. 6 is a block diagram illustrating an exemplary neural network model, in accordance with aspects of the present disclosure. A neural network (NN) model may be defined as a model structure plus a parameter set. A network operator, infrastructure vendor, or third party may define the model. The model structure may be identified by a model ID, which should be unique in the network. In some aspects, the model structure includes a default parameter set. Each model ID is associated with a neural network function. The parameter set includes weights of the neural network model and other configuration parameter. The parameter set may be location or configuration specific.

Figure 7:
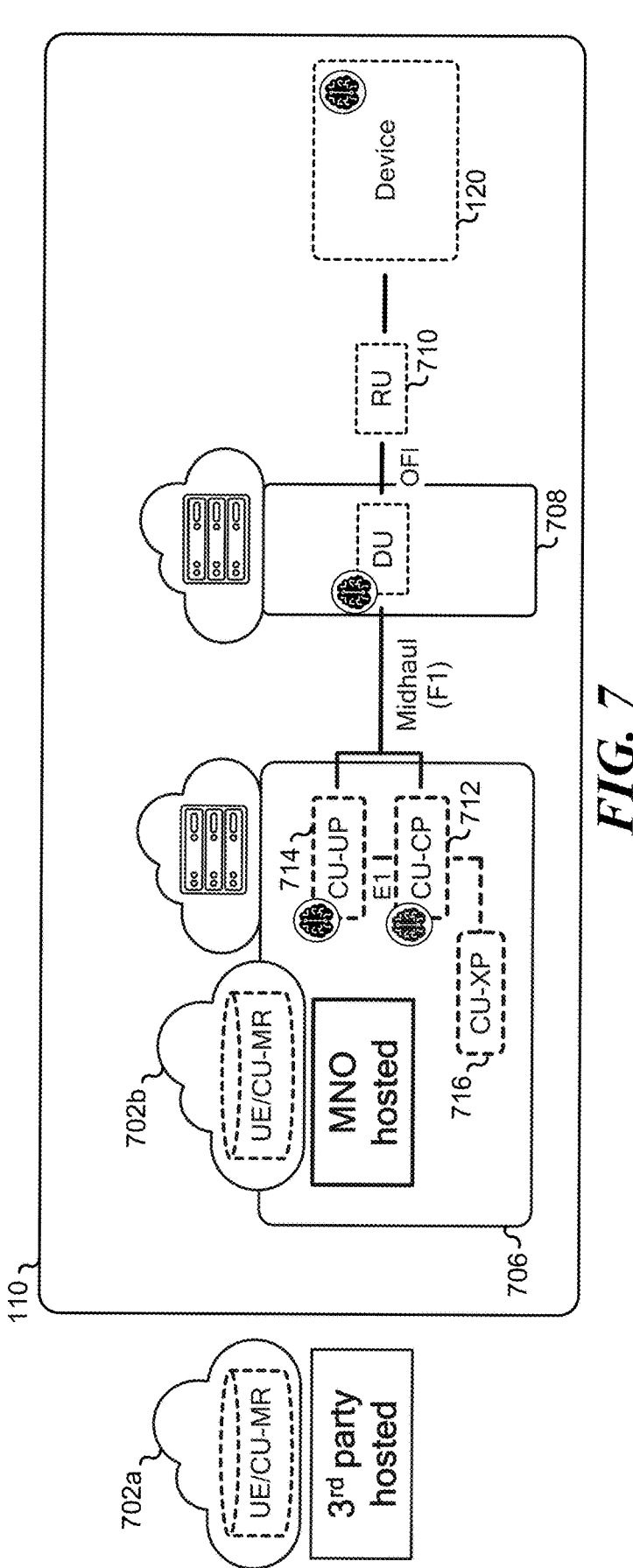
FIG. 7 is a block diagram illustrating an exemplary architecture for managing a neural network model, in accordance with aspects of the present disclosure.

FIG. 7 is a block diagram illustrating an exemplary architecture for managing a neural network model, in accordance with aspects of the present disclosure. A centralized unit model repository (CU-MR) 702a, 702b may be hosted by a third party or by a mobile network operator (MNO), for example, at a base station 110. The CU-MR 702a, 702b stores a neural network model for training or inference for use at the UE 120 or network entities, such as a centralized unit (CU) 706, a distributed unit (DU) 708, or radio access network (RAN) intelligent controller (RIC) (not shown).

The base station 110 may include a number of logical entities including the CU 706, at least one DU 708 (only one shown) and at least one radio unit (RU) 710 (only one shown.) The CU 706 includes a centralized unit control plane (CU-CP) 712 for managing the radio resource control (RRC) layer and packet data convergence protocol (PDCP) layer of the base station 110, a centralized unit user plane (CU-UP) 714 for managing the user plane part of the PDCP layer and the user plane part of the service data adaptation protocol (SDAP) layer, and a centralized unit machine learning plane (CU-XP) 716 for managing machine learning functions, such as which model to select to execute an NNF. The CU-CP 712, CU-UP 714, and CU-XP 716 communicate with each other via an El interface. While the CU-XP 716 is illustrated in FIG. 7 as being part of the base station 110, separate from the CU-CP 712, the CU-XP 716 may alternatively be implemented as part of the CU-CP 712 or as (a portion of) a network entity separate from the base station 110. The centralized unit (CU) 706 communicates with each of the DUs 708 via an F1 interface. The DU 708 is for managing the radio link control (RLC) layer, the media access control (MAC) layer, and parts of the physical (PHY) layer of the base station 110. The DU 708 communicates with each of the RUs 710 via a fronthaul, which may be an ORAN fronthaul interface (OFI) interface. The RU 710 of the base station 110 manages the digital front end and parts of the PHY layer for communicating wirelessly with the UEs 120.

Figure 8:
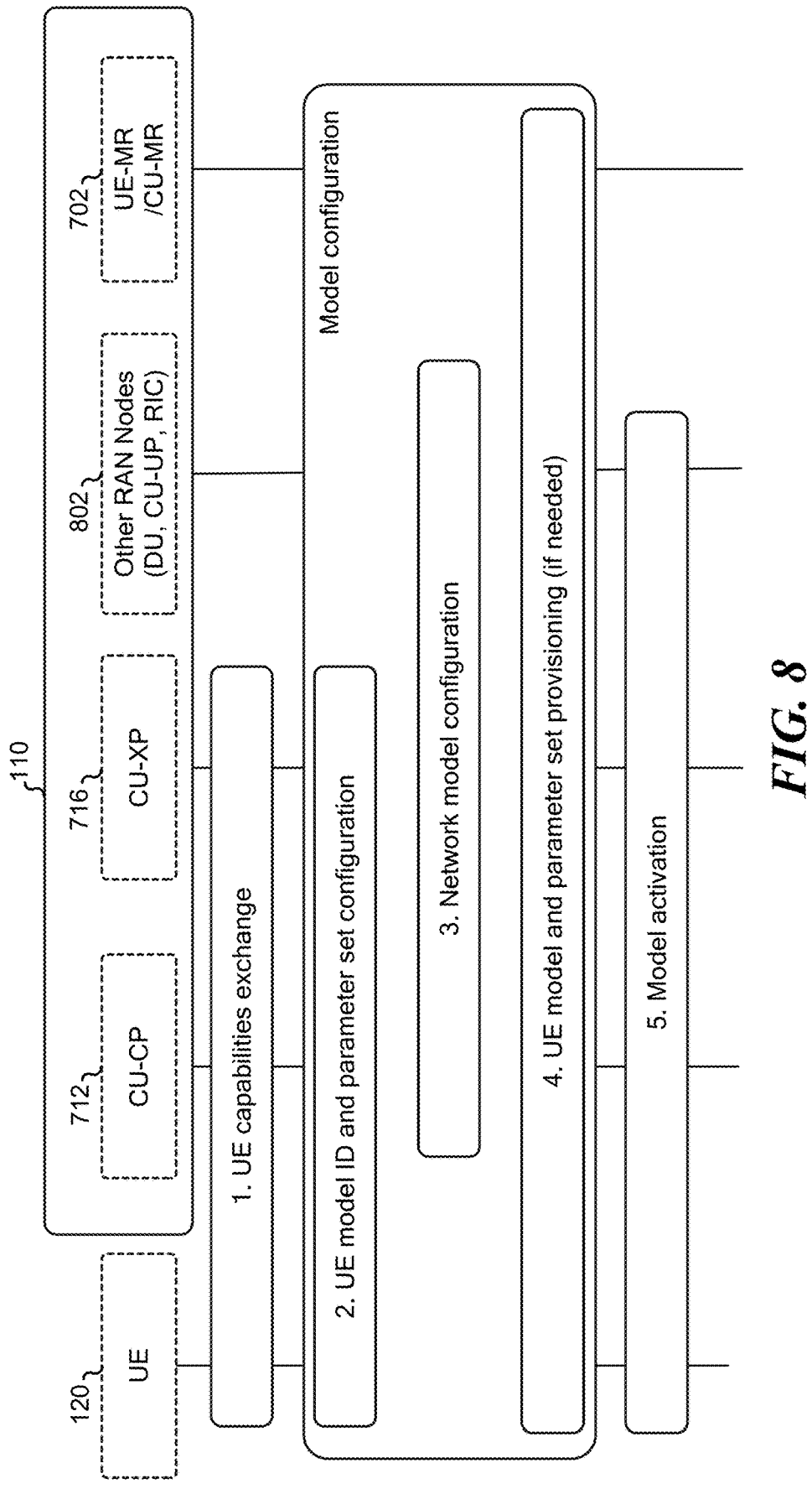
FIG. 8 is a timing diagram illustrating a call flow for managing a neural network model, in accordance with aspects of the present disclosure.

FIG. 8 is a timing diagram illustrating a call flow for managing a neural network model, in accordance with aspects of the present disclosure. At time 1, the UE 120 transmits, to the base station 110, UE capability information indicating at least one radio capability of the UE and at least one machine learning capability of the UE. In some cases, the UE 120 may transmit the UE capability information during a radio resource control (RRC) setup procedure in an RRC connection setup message. In some cases, the UE capability information may be received by the CU-CP 712 of the base station 110, which may share the information with the CU-XP 716 as a container.

In some cases, the radio capability of the UE 120 may indicate a capability of the UE 120 to perform one or more wireless communications management procedures, which may be machine learning-based. For example, the radio capability of the UE 120 may indicate at least one of a capability to perform a (machine learning-based) cell reselection procedure, a capability to perform a (machine learning-based) idle or inactive mode measurement procedure, a capability to perform a (machine-learning based) radio resource management (RRM) measurement procedure, a capability to perform a (machine learning-based) radio link monitoring (RLM) procedure, a capability to perform a (machine learning-based) channel state information (CSI) measurement procedure, a capability to perform a (machine learning-based) precoding matrix indicator (PMI), rank indicator (RI), and channel quality indicator (CQI) feedback procedure, a capability to perform a (machine learning-based) radio link failure (RLF) and beam failure recovery (BFR) procedure, and/or a capability to perform a (machine learning-based) RRM relaxation procedure.

In some cases, the at least one machine learning capability of the UE 120 may indicate one or more capabilities supported by the UE 120 for performing machine learning. For example, the machine learning capability of the UE 120 may indicate long term capabilities, such as a machine learning training capability, a machine learning inference capability, a processing capability, one or more supported machine learning model formats, one or more supported machine learning libraries, and/or an indication of one or more locally cached machine learning models. The machine learning training and inference capabilities may further indicate whether hardware acceleration is supported and a maximum model size. The machine learning capability of the UE 120 may also indicate short term capabilities, such as a list of supported models for each NNF and a list of supported model combinations.

At time 2, the CU-CP 712 determines whether to use machine learning functionality to perform one or more wireless communications management procedures. For example, in some cases, the CU-CP 712 may select a machine learning-based wireless communications management procedure to be used at the UE 120 and determine the at least one NNF for performing at least a portion of the selected machine learning-based wireless communications management procedure. In other words, the base station 110 may determine which NNFs, if any, are supported by the UE 120 and may generate a requested NNF list.

The CU-CP 712 may send a message, such as a context setup request message, to the CU-XP 716 to establish a context for the UE 120 for using the at least one NNF. The context setup request message includes an indication of the at least one NNF determined by the CU-CP 712 (e.g., the requested NNF list) and a request to the CU-XP 716 to support the use of the at least one NNF.

The context setup request message may include the at least one machine learning capability of the UE 120. The CU-XP 716 may then select at least one machine learning model for use in the at least one NNF to perform at least the portion of the machine learning-based wireless communications management procedure. In some cases, the CU-XP 716 may select the at least one machine learning model based, at least in part, on the at least one machine learning capability of the UE. Additionally, in some cases, the CU-XP 716 may select the at least one machine learning model based on at least one of a cell ID, gNB ID, or UE context information. In some cases, the UE context information may indicate such information as a UE type, a data radio bearer (DRB) configuration, and/or an antenna switching (AS) configuration.

Thereafter, the CU-XP 716 sends a context setup response message to the CU-CP 712. The context setup response message may provide an indication that the UE context has been successfully set up for the at least one NNF indicated in the context setup request message (e.g., an accepted NNF list). Additionally, the context setup response message may provide an indication of the at least one machine learning model selected for the at least one NNF to perform at least the portion of the machine learning-based wireless communications management procedure. In some cases, the indication of the at least one machine learning model may comprise a machine learning model ID.

Thereafter, the base station 110 (e.g., via the CU-CP 712) transmits, to the UE 120, machine learning configuration information based on the UE capability information received at time 1,. In some cases, the base station 110 may transmit the machine learning configuration information in an RRC reconfiguration message. The machine learning configuration information may include an indication of the at least one NNF (e.g., the accepted NNF list) and the at least one machine learning model corresponding to the at least one NNF. In some cases, the at least one NNF is indicated by an NNF ID and the at least one machine learning model is indicated by a machine learning model ID. As noted, the at least one machine learning model may be associated with a model structure and one or more sets of parameters (e.g., weights, biases, and/or activation functions). In some cases, the machine learning model ID may indicate the model structure associated with the at least one machine learning model, while the one or more sets of parameters may be indicated in the machine learning configuration information by a parameter set ID.

In some cases, the machine learning model and machine learning model structure may be associated with multiple sets of parameters (e.g., the one or more sets of parameters include multiple sets of parameters). In such cases, each set of parameters may be valid for use with the model structure for a particular geographic area, such as a cell, or a particular configuration. In other words, depending on, for example, the particular geographic area or configuration of the UE 120, different sets of parameters may be used with the model structure. This may allow the UE 120 to use one model structure for performing the machine learning-based wireless communications management procedure while adaptively changing the set of parameters used with the model structure depending on the particular geographic area or configuration of the UE 120.

In response to receiving the RRC reconfiguration message including the machine learning configuration information, the UE 120 transmits an RRC reconfiguration complete message to the base station 110, which may indicate that the UE 120 successfully received the machine learning configuration information.

In some cases, NNFs and corresponding machine learning models may be used in both the base station 110 and the UE 120. For example, the base station 110 may configure the UE 120 with a particular NNF and corresponding first ML model for performing at least a portion of one or more machine learning-based wireless communications management procedure. However, the base station 110 may also configure itself with a second machine learning model for performing at least a portion of the machine learning-based wireless communications management procedure, as seen at time 3. In some cases, the first machine learning model and the second machine learning model may comprise matched machine learning models whereby the output of one of the machine learning models is used as an input to the other machine learning model.

After setting up the context for the UE 120 associated with the at least one NNF and selecting the at least one machine learning model (e.g., the first machine learning model) corresponding to the at least one NNF, the CU-XP 716 may additionally determine a second machine learning model for the base station 110 to perform at least a portion of the machine learning-based wireless communications management procedure. In some cases, the CU-XP 716 may determine the other machine learning model for the base station 110 based on machine learning capability information associated with a network entity 802 executing the second machine learning model. The network entity 802 may be a DU (such as the DU 708 of FIG. 8), CU-UP, (such as the CU-UP 714 of FIG. 7) or a radio access network (RAN) intelligent controller (RIC). The CU-XP 716 may send a machine learning model setup request message to the network entity 802, requesting that the network entity 802 set up the second machine learning model for performing at least a portion of the machine learning-based wireless communications management procedure. Thereafter, once the second machine learning model has been set up, the network entity 802 sends a machine learning model setup response message to the CU-XP 716, indicating that the setup of the second machine learning model is complete.

At time 4, the UE 120 and/or network entity 802 may then download the at least one machine learning model corresponding to the at least one NNF if the at least one machine learning model is not locally stored at the UE 120 or network entity 802. For example, in some cases, if the machine learning model is not locally stored, the UE 120 or network entity 802 may receive, from the centralized unit model repository (CU-MR) 702 of the base station 110 at least one of the machine learning model structure corresponding to the at least one machine learning model or the one or more sets of parameters (e.g., weights, biases, and/or activation functions) associated with the machine learning model structure.

Once the UE 120 and network entity 802 have received the machine learning structure and/or one or more parameters associated with the at least one machine learning model, the UE 120 and/or network entity 802 indicates that the at least one machine learning model is ready to be used. In some cases, the message may be received by the CU-CP 712 and, thereafter, forwarded to the CU-XP 716.

At some point in the future, the base station 110 may decide that the UE 120 and/or the network entity 802 should use the at least one NNF and corresponding at least one machine learning model to perform at least the portion of the machine learning-based wireless communications management procedure. In such cases, at time 5, the base station 110 transmits a signal activating use of the at least one machine learning model to perform the at least the portion of the machine learning-based wireless communications management procedure. In some cases, the signal activating the use of the at least one machine learning model may be transmitted by the base station 110 (e.g., via the CU-CP 712 or CU-XP 716) in a media access control-control element (MAC-CE) or in RRC signaling to the UE or via F1 or E2 signaling to the network entity 802.

Thereafter, the UE 120 and/or network entity 802 may perform the machine learning-based wireless communications management procedure using the at least one machine learning model based on the activation signal. In some cases, performing the machine learning-based wireless communications management procedure may include inputting one or more input variables to the at least one machine learning model and obtaining an output from the at least one machine learning model based on the one or more input variables.

As noted above, the at least one machine learning model may be associated with a model structure and one or more sets of parameters. When performing the machine learning-based wireless communications management procedure, the UE 120 may determine a particular set of parameters to use in combination with the machine learning structure to process the one or more input variables. This determination may be based on, for example, a particular geographic area, such as a cell, or configuration of the UE 120. For example, in some cases, when the UE 120 is in a first cell, the UE 120 may select a first set of parameters for use with the model structure to perform the machine learning-based wireless communications management procedure. In other cases, when the UE 120 is in a second cell, the UE 120 may select a second set of parameters for use with the model structure to perform the machine learning-based wireless communications management procedure.

As an example, the machine learning-based wireless communications management procedure may include a cell reselection and idle/inactive mode measurement procedure. In such cases, to perform the cell reselection and idle/inactive mode measurement procedure, the UE 120 may input one or more input variables into a model structure of a machine learning model specifically trained for cell reselection and idle/inactive mode measurements. The UE 120 may also select a set of parameters to use with the model structure (e.g., weights, biases, and/or activation functions), as described above. In some cases, the input variables to the machine learning model may include, for example, serving cell measurements (e.g., reference signal received power (RSRP) measurements associated with the base station 110), neighboring cell measurements, and/or services specified by the UE 120. The at least one machine learning model may take into account the serving cell measurements, the neighboring cell measurements, and the services specified by the UE 120, and provide an output, indicating a target cell to reselect and/or target cells to perform the idle/inactive mode measurements.

According to aspects of the present disclosure, a centralized unit control plane (CU-CP) and/or centralized unit machine learning plane (CU-XP) may decide to configure a network model for inference and/or training. The configuration may be initiated either by the network or in response to a UE request. The configured model may run in a network entity, such as a distributed unit (DU), RAN intelligent controller (RIC), centralized unit user plane (CU-UP), CU-CP, CU-XP, or any other network entity. If the model and parameter set are not locally cached in the running host such as DU/RIC/CU-UP, etc., the model and parameter set will be downloaded. When the model and parameter set are ready, the CU-CP and/or CU-XP activates the model. A UE model may be configured together with the network model, for example, to compress and decompress channel state feedback (CSF) transmitted across the wireless interface.

Figure 9:
FIG. 9 is a timing diagram illustrating a more detailed call flow for configuring a network-based neural network model, in accordance with aspects of the present disclosure.

FIG. 9 is a timing diagram illustrating a more detailed call flow for configuring a network-based neural network model, in accordance with aspects of the present disclosure. At time 1, the CU-CP 712 decides which NNF to use, for example, based upon a UE capabilities exchange, UE request, or some other trigger. The CU-CP 712 transmits an ID of the determined NNF to the CU-XP 716 in an NNF request message. At time 2, the CU-XP 716 selects a model and parameter set based on the requested NNF. The CU-XP 716 transmits a model setup request to the network entity 802, which will run the model. The model setup request may include a model ID and a parameter set ID. The network entity 802 determines a location of the parameter set and the model by transmitting a model querying request at time 3, to a location database, such as a model and data access coordinator (MDAC) 902. The model querying request may include the model ID and the parameter set ID. At time 4, the MDAC 902 responds with a model querying response indicating locations of the model and parameter set. The MDAC 902 may indicate the locations with a model URL (uniform resource locator) and a parameter set URL.

After retrieving the locations, the network entity 802 downloads the model and parameter set from the centralized unit model repository (CU-MR) 702. The network entity 802 may communicate with the CU-MR 702, for example, with a user plane protocol. At time 5, the network entity 802 sends a request for the model with a hypertext transfer protocol (HTTP) get message indicating the model URL. At time 6, the network entity 802 receives a response from the CU-MR 702 as a 200 OK message, including the model. At time 7, the network entity 802 sends a request for the parameter set with an HTTP get message indicating the parameter set URL. At time 8, the network entity 802 receives a response from the CU-MR 702 as a 200 OK message, including the parameter set.

After downloading the model, at time 9, the network entity 802 transmits a model setup response to the CU-XP 716, confirming the model ID and parameter set ID are configured in response to the model setup request transmitted at time 2. At time 10, the CU-XP 716 transmits an NNF response to the CU-CP 712 confirming the NNF is configured.

Figure 10:
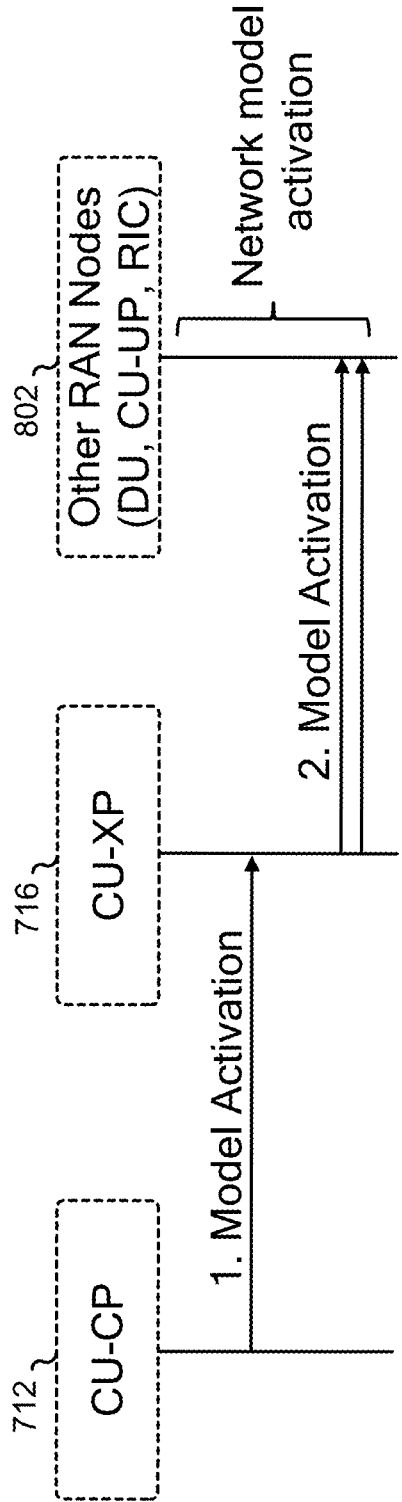
FIG. 10 is a timing diagram illustrating a call flow for activating a network-based neural network model, in accordance with aspects of the present disclosure.

After model configuration, activation should occur to enable use of the model. FIG. 10 is a timing diagram illustrating a call flow for activating a network-based neural network model, in accordance with aspects of the present disclosure. Radio access network (RAN) side model activation may be achieved by the base station 110 informing the inference and/or training nodes of the network entity 802 to start running the model, once the model and parameter set are ready. More specifically, at time 1, the CU-CP 712 transmits a model activation message to the CU-XP 716. In response, at time 2, the CU-XP 716 transmits a model activation message to the network entity 802 that performs training and/or inference. In the case of distributed unit (DU) model activation, F1 signaling may be employed. For other network node model activation, E2 signaling may occur. The CU-XP 716 may send model activations to multiple other network nodes in parallel. Although not shown, UE-side model activation may be achieved by media access control-control element (MAC-CE), or radio resource control (RRC) signaling.

Figure 11:
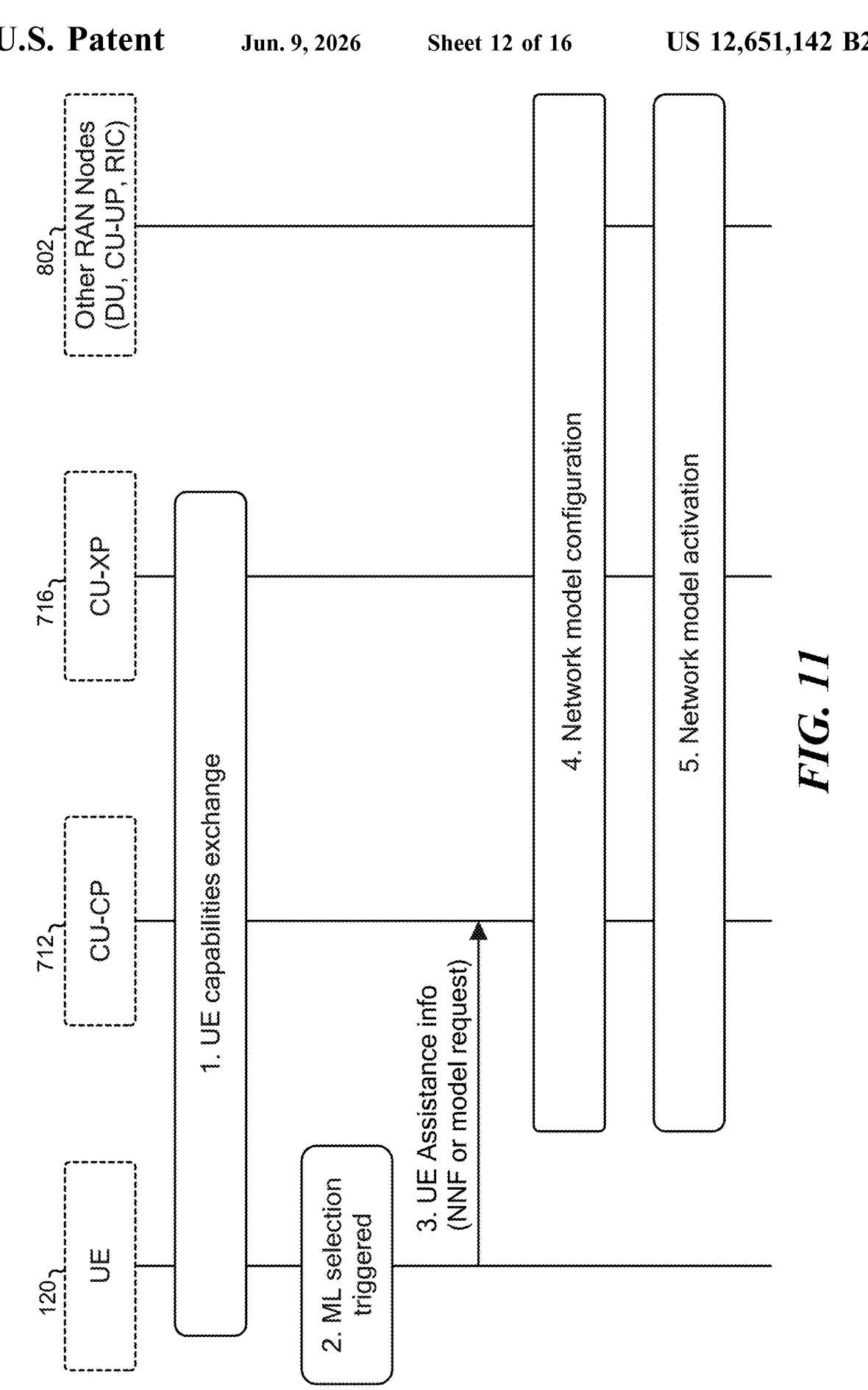
FIG. 11 is a timing diagram illustrating a call flow for machine learning initiated by a UE request, in accordance with aspects of the present disclosure.

In some aspects of the present disclosure, a UE triggers configuration of a network model. FIG. 11 is a timing diagram illustrating a call flow for machine learning initiated by a UE request, in accordance with aspects of the present disclosure. At time 1, a UE capabilities exchange occurs. A UE radio capability exchange may occur between the UE 120 and the CU-CP 712. A UE machine learning capability exchange may occur between the UE 120 and the CU-XP 716. More details of the capabilities exchange will be provided with respect to FIG. 12.

At time 2, an event at the UE 120 triggers machine learning for a network-based model. In some aspects of the present disclosure, triggers for a UE machine learning (ML) request may be based on a scope of the model. That is, each artificial intelligence or machine learning (AI/ML) model may have an applicable scope such as applicable location (e.g., cell, cell list, area (tracking area identity (TAI), RAN-based notification area (RNA), multimedia broadcast single frequency network (MBSFN) area, and geographical area), applicable network slice, applicable data network name (DNN), applicable public land mobile network (PLMN) (including private network ID-non-public network (PNI-NPN), or stand-alone non-public network (SNPN) ID) list. Other scopes include applicable UE types, which may be defined by masked international mobile equipment identity software version (IMEISV) bits, applicable radio resource control (RRC) states, applicable services (e.g., multimedia broadcast service (MBS)), sidelink, and applicable configuration (e.g., multiple input, multiple output (MIMO), dual connectivity/carrier aggregation (DC/CA), and millimeter wave (mmW)).

When the UE transitions into or out of the applicable scope of a model, a UE machine learning (ML) request may be triggered for configuration of a network model. To avoid the flooding of too many UE ML requests, the network may configure a blacklist, and/or whitelist of UE triggers. The network may also configure a prohibit timer to prevent sending of requests too frequently. The black list, prohibit timer, and/or whitelist may be configured by an RRC reconfiguration message. For a neural network function (NNF) or model in neither the whitelist nor blacklist, the UE can autonomously request network configuration. In some aspects, the network only allows requesting of a model in the whitelist.

Figure 12:
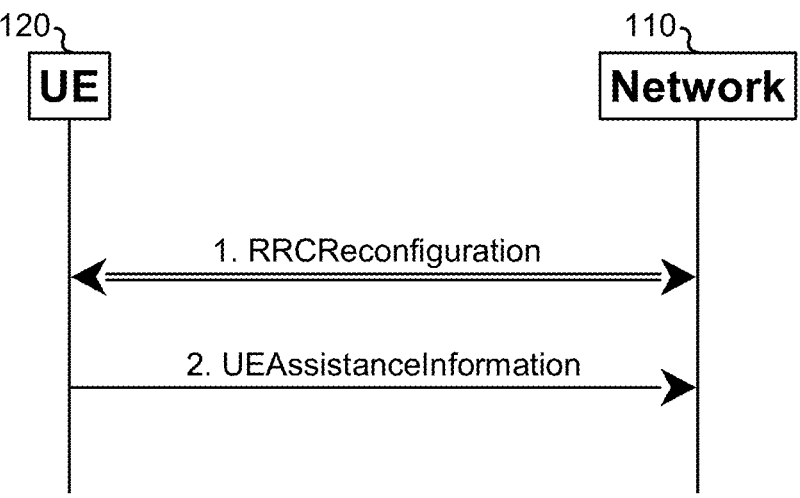
FIG. 12 is a timing diagram illustrating a call flow for a UE and network capability exchange, in accordance with aspects of the present disclosure.

The UE 120 can request machine learning (ML) configuration with a UE assistance information (UAI)-based network configuration, at time 3. The messaging may be part of a radio resource control (RRC) reconfiguration process. FIG. 12 is a timing diagram illustrating a call flow for a UE machine learning request, in accordance with aspects of the present disclosure. At time 1, an RRC configuration process occurs between the UE 120 and base station 110. At time 2, the UE 120 transmits a UAI message to the base station 110 including an NNF or a model request.

According to aspects of the present disclosure, a machine learning assistance IE can be added into the UAI message. The machine learning assistance IE may include a machine learning request for a model or model list. The model may be identified by a model ID or model ID plus a parameter set ID. The machine learning request may also indicate an NNF or NNF list request. The machine learning assistance IE may include an event indicating an applicable condition change, in other words, informing the network of what has changed for an already configured model. For example, for a cell-specific model, the UE may inform the network of a cell change, which specifies the network needs a new model and/or parameter set. The event may indicate a model ID, condition (e.g., cell, area), and whether the UE is transitioning into or out of the condition.

Returning to FIG. 11, at time 4, the network model is configured, as previously described with respect to FIG. 9. At time 5, the network model is activated, as previously described with respect to FIG. 10.

Figure 13:
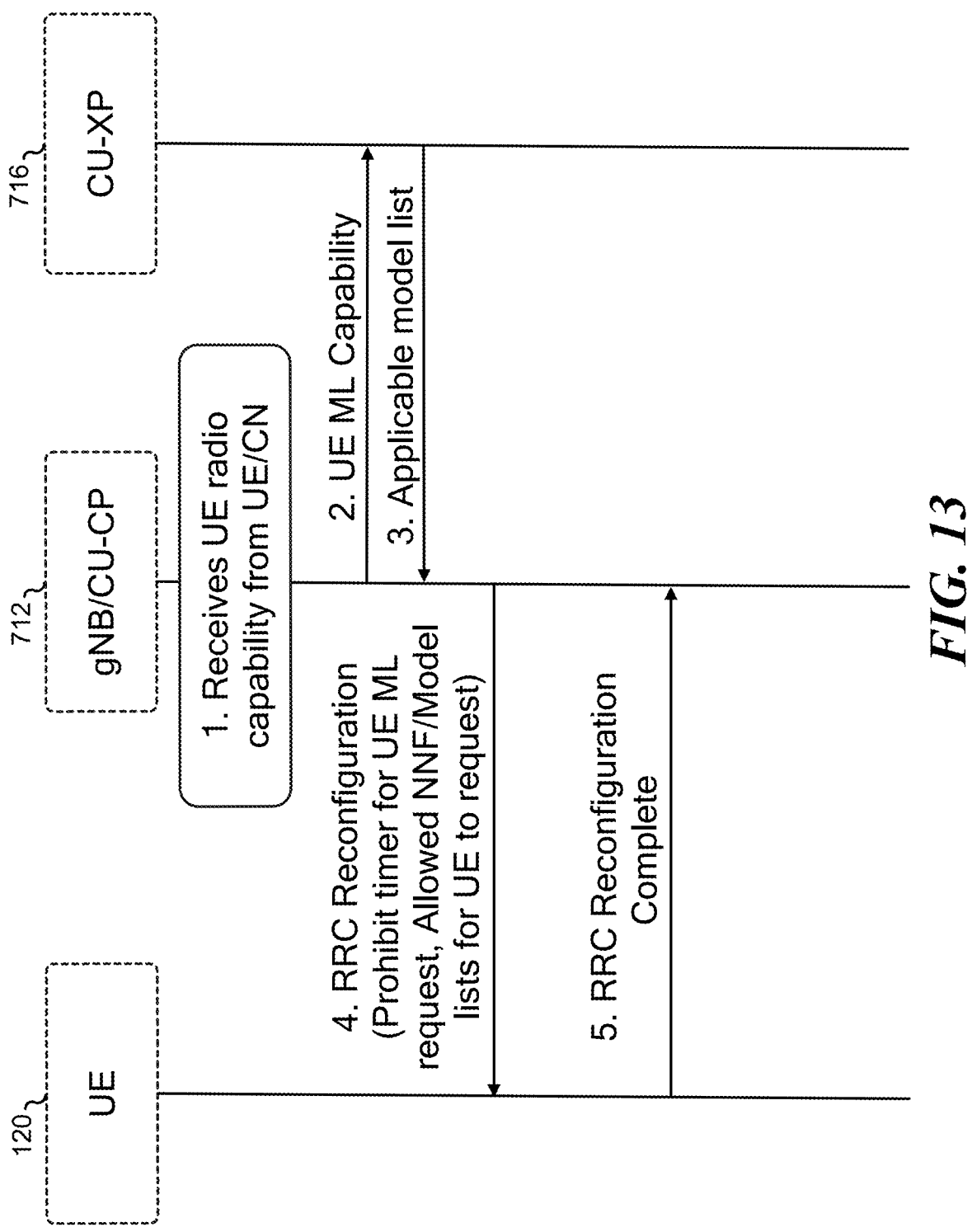
FIG. 13 is a timing diagram illustrating a call flow for a UE machine learning request, in accordance with aspects of the present disclosure.

More details of the UE capabilities exchange will now be provided. FIG. 13 is a timing diagram illustrating a call flow for a UE 120 and network capability exchange, in accordance with aspects of the present disclosure. For a UE radio capability, the base station or centralized unit control plane (CU-CP) 712 receives UE radio capability from either a core network (CN) or a UE 120 during a radio resource control (RRC) setup or resume procedure, using a UE existing capability handling procedure, at time 1. In FIG. 13, the entire aggregated base station and a base station component are designated by reference number 712. Either may perform the functions associated with the box designated 712. According to aspects of the present disclosure, new capability bits are introduced, such as bits indicating support of UE requested machine learning (ML) configurations, indicating UE supported neural network functions (NNFs), and indicating UE supported models.

At time 2, the CU-CP 712 of the base station reports the UE machine learning (ML) capability to the CU-XP 716. A UE machine learning capability may include details of the UE machine learning capability. In other aspects, these details are provided within the UE radio capability. The CU-CP 712 determines the applicable neural network functions (NNFs) and/or models for the UE 120, at time 3.

After the CU-XP 716 determines which AI/ML models support the NNFs, at time 4, the CU-CP 712 configures the UE 120 for a machine learning request. For example, the CU-CP 712 may transmit an RRC reconfiguration message including a prohibit timer for the UE machine learning request, allowed NNFs and/or model lists for the UE 120 to request. This information may be transmitted in a UAI format. A neural network function (NNF)/model list (whitelist) allows the UE 120 to request particular NNFs/ models. The RRC reconfiguration message may also include a neural network function (NNF)/model list (blacklist), indicating the NNFs/models the UE 120 is prohibited from requesting. The RRC reconfiguration message may further indicate events allowing the UE 120 to report for triggering a network model configuration. In some aspects, the UE 120 is aware that the network supports the UE triggered network model configuration by receiving this message.

FIG. 14 is a flow diagram illustrating an example process 1400 performed, for example, by a base station, in accordance with various aspects of the present disclosure. The example process 1400 is an example of configuration of a network-based artificial intelligence or machine learning (AI/ML) model. The operations of the process 1400 may be implemented by a base station 110.

At block 1402, the base station receives a user equipment (UE) radio capability and a UE machine learning capability. For example, the base station (e.g., using the antenna 234, MOD/DEMOD 232, MIMO detector 236, receive processor 238, controller/processor 240, and/or memory 242) may receive the radio capabilities. The UE capability information may be received by the CU-CP of the base station, which may share the information with the CU-XP as a container. In some cases, the radio capability of the UE 120 may indicate a capability of the UE 120 to perform one or more wireless communications management procedures, which may be machine learning-based. In some cases, the at least one machine learning capability of the UE may indicate one or more capabilities supported by the UE for performing machine learning. For example, the machine learning capability of the UE may indicate long term capabilities, and may also indicate short term capabilities.

At block 1404, the base station determines a neural network function (NNF) based on the UE radio capability. For example, the base station (e.g., using the controller/processor 240, and/or memory 242) may determine the neural network function. In some aspects, the CU-CP may select a machine learning-based wireless communications management procedure to be used at the UE and determine the NNF for performing at least a portion of the selected machine learning-based wireless communications management procedure. In other words, the base station may determine which NNFs, if any, are supported by the UE and may generate a requested NNF list.

At block 1406, the base station determines a neural network model comprising a model structure and a parameter set, based on the NNF, the UE machine learning capability, and a capability of a network entity. For example, the base station (e.g., using the controller/processor 240, and/or memory 242) may determine the neural network model. The network entity may be one or more units of the base station, including a distributed unit (DU), a centralized unit control plane (CU-CP), a centralized unit user plane (CU-UP), or a centralized unit machine learning plane (CU-XP). In other aspects, the network entity is another network device including a radio access network intelligent controller (RIC).

At block 1408, the base station configures the network entity with the neural network model. For example, the base station (e.g., using the antenna 234, MOD/DEMOD 232, TX MIMO detector 230, transmit processor 220, controller/ processor 240, and/or memory 242) may configure the network entity. The base station may configure the network entity in response to receiving a UE message from a UE triggering the configuring.

FIG. 15 is a flow diagram illustrating an example process 1500 performed, for example, by a UE, in accordance with various aspects of the present disclosure. The example process 1500 is an example of configuration of a network-based artificial intelligence or machine learning (AI/ML) model. The operations of the process 1400 may be implemented by a user equipment 120.

At block 1502, the user equipment transmits, to a base station, a request for a machine learning configuration for a network-based neural network model. The request may comprise a UE assistance information (UAI) message. The UAI message may comprise an information element for a model, a neural network function (NNF), and a machine learning trigger event. For example, the base station (e.g., using the antenna 252, DEMOD/MOD 254, TX MIMO processor 266, transmit processor 264, controller/processor 280, and/or memory 282) may transmit the request. The request messaging may be part of a radio resource control (RRC) reconfiguration process.

At block 1504, the user equipment activates a UE-based neural network model in response to receiving a UE model activation message from the base station. For example, the base station (e.g., using the controller/processor 280, and/or memory 82) may activate the neural network model. Activation enables use of the neural network model.

Example Aspects

Aspect 1: A method of wireless communication by a base station, comprising: receiving a user equipment (UE) radio capability and a UE machine learning capability; determining a neural network function (NNF) based on the UE radio capability; determining a neural network model comprising a model structure and a parameter set, based on the NNF, the UE machine learning capability, and a capability of a network entity; and configuring the network entity with the neural network model.

Aspect 2: The method of Aspect 1, in which the network entity comprises one or more units of the base station, including a distributed unit (DU), a centralized unit control plane (CU-CP), a centralized unit user plane (CU-UP), or a centralized unit machine learning plane (CU-XP).

Aspect 3: The method of Aspect 1, in which the network entity comprises another network device including a radio access network intelligent controller (RIC).

Aspect 4: The method of any of the preceding Aspects, further comprising: transmitting, from a centralized unit control plane (CU-CP) to a centralized unit machine learning plane (CU-XP), an NNF request including an NNF identifier (ID); transmitting a model setup request from the CU-XP to the network entity, the model setup request including a model ID corresponding to the model structure and a parameter set ID corresponding to the parameter set; transmitting the neural network model to the network entity based on the parameter set ID and the model ID; and receiving a model setup response from the network entity confirming the neural network model is configured in the network entity.

Aspect 5: The method of any of the preceding Aspects, further comprising transmitting the neural network model to the network entity via a user plane protocol.

Aspect 6: The method of any of the preceding Aspects, further comprising activating the neural network model.

Aspect 7: The method of any of the preceding Aspects, in which the activating comprises transmitting a network model activation message from a centralized unit control plane (CU-CP) to a centralized unit machine learning plane (CU-XP), and transmitting the network model activation message from the CU-XP to the network entity.

Aspect 8: The method of any of the preceding Aspects, further comprising activating a UE model for operation at a UE by transmitting a UE model activation message to a distributed unit (DU) for forwarding to the UE.

Aspect 9: The method of any of the preceding Aspects, further comprising receiving a UE message from a UE triggering the configuring of the network entity.

Aspect 10: The method of any of the preceding Aspects, in which the UE message comprises a UE assistance information message comprising the NNF or a model request.

Aspect 11: The method of any of the preceding Aspects, further comprising: transmitting, to a UE, a prohibit timer for a UE machine learning request, in response to receiving the UE radio capability and the UE machine learning capability; transmitting, to the UE, a white list of allowed NNFs and neural network models based on the UE radio capability and the UE machine learning capability; transmitting, to the UE, a black list of prohibited NNFs and neural network models based on the UE radio capability and the UE machine learning capability; and receiving, from the UE, a request for configuring the network entity with the neural network model.

Aspect 12: The method of any of the preceding Aspects, further comprising transmitting, to the UE, a list of events triggering the UE to report a change in conditions for initiating an update of the neural network model.

Aspect 13: The method of any of the preceding Aspects, in which the request for configuring the network entity comprises a UE assistance information message.

Aspect 14: A method of wireless communication by a user equipment (UE), comprising: transmitting, to a base station, a request for a machine learning configuration for a network-based neural network model, the request comprising a UE assistance information (UAI) message, the UAI message comprising an information element for a model, a neural network function (NNF), and a machine learning trigger event; and activating a UE-based neural network model in response to receiving a UE model activation message from the base station.

Aspect 15: The method of Aspect 14, further comprising: receiving, from the base station, a prohibit timer for the request for the machine learning configuration, in response to transmitting a UE radio capability and a UE machine learning capability; receiving, from the base station, a white list of allowed NNFs and neural network models based on the UE radio capability and the UE machine learning capability; and receiving, from the base station, a black list of prohibited NNFs and neural network models.

Aspect 16: The method of Aspect 14 or 15, further comprising receiving, from the base station, a list of events triggering the UE to report a change in conditions that initiate an update of the network-based neural network model.

Aspect 17: An apparatus for wireless communication by a base station, comprising: a memory; and at least one processor coupled to the memory, the at least one processor configured: to receive a user equipment (UE) radio capability and a UE machine learning capability; to determine a neural network function (NNF) based on the UE radio capability; to determine a neural network model comprising a model structure and a parameter set, based on the NNF, the UE machine learning capability, and a capability of a network entity; and to configure the network entity with the neural network model.

Aspect 18: The apparatus of Aspect 17, in which the network entity comprises one or more units of the base station, including a distributed unit (DU), a centralized unit control plane (CU-CP), a centralized unit user plane (CU-UP), or a centralized unit machine learning plane (CU-XP).

Aspect 19: The apparatus of Aspect 17, in which the network entity comprises another network device including a radio access network intelligent controller (RIC).

Aspect 20: The apparatus of any of the Aspects 17-19, in which the at least one processor is further configured: to transmit, from a centralized unit control plane (CU-CP) to a centralized unit machine learning plane (CU-XP), an NNF request including an NNF identifier (ID); to transmit a model setup request from the CU-XP to the network entity, the model setup request including a model ID corresponding to the model structure and a parameter set ID corresponding to the parameter set; to transmit the neural network model to the network entity based on the parameter set ID and the model ID; and to receive a model setup response from the network entity confirming the neural network model is configured in the network entity.

Aspect 21: The apparatus of any of the Aspects 17-20, in which the at least one processor is further configured to transmit the neural network model to the network entity via a user plane protocol.

Aspect 22: The apparatus of any of the Aspects 17-21, in which the at least one processor is further configured to activate the neural network model.

Aspect 23: The apparatus of any of the Aspects 17-22, in which the at least one processor is further configured to activate by transmitting a network model activation message from a centralized unit control plane (CU-CP) to a centralized unit machine learning plane (CU-XP), and transmitting the network model activation message from the CU-XP to the network entity.

Aspect 24: The apparatus of any of the Aspects 17-23, in which the at least one processor is further configured to activate a UE model for operation at a UE by transmitting a UE model activation message to a distributed unit (DU) for forwarding to the UE.

Aspect 25: The apparatus of any of the Aspects 17-24, in which the at least one processor is further configured to receive a UE message from a UE triggering the configuring of the network entity.

Aspect 26: The apparatus of any of the Aspects 17-25, in which the UE message comprises a UE assistance information message comprising the NNF or a model request.

Aspect 27: The apparatus of any of the Aspects 17-26, in which the at least one processor is further configured: to transmit, to a UE, a prohibit timer for a UE machine learning request, in response to receiving the UE radio capability and the UE machine learning capability; to transmit, to the UE, a white list of allowed NNFs and neural network models based on the UE radio capability and the UE machine learning capability; to transmit, to the UE, a black list of prohibited NNFs and neural network models based on the UE radio capability and the UE machine learning capability; and to receive, from the UE, a request for configuring the network entity with the neural network model.

Aspect 28: The apparatus of any of the Aspects 17-27, in which the at least one processor is further configured to transmit, to the UE, a list of events triggering the UE to report a change in conditions for initiating an update of the neural network model.

Aspect 29: The apparatus of any of the Aspects 17-28, in which the request for configuring the network entity comprises a UE assistance information message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a base station, comprising:
  receiving a user equipment (UE) radio capability and a UE machine learning capability;
  determining a neural network function (NNF) identifier (ID) based on the UE radio capability;
  selecting a neural network model from a plurality of neural network models based on the NNF ID, the UE machine learning capability, and a capability of a network entity, the neural network model comprising a model structure and a parameter set;
  configuring the network entity with the neural network model;
  transmitting, from a centralized unit control plane (CU-CP) to a centralized unit machine learning plane (CU-XP), an NNF request including the NNF identifier (ID);
  transmitting a model setup request from the CU-XP to the network entity, the model setup request including a model ID corresponding to the model structure and a parameter set ID corresponding to the parameter set;
  transmitting the neural network model to the network entity based on the parameter set ID and the model ID; and
  receiving a model setup response from the network entity confirming the neural network model is configured in the network entity.

2. The method of claim 1, in which the network entity comprises one or more units of the base station, including a distributed unit (DU), the centralized unit control plane (CU-CP), a centralized unit user plane (CU-UP), or the centralized unit machine learning plane (CU-XP).

3. The method of claim 1, in which the network entity comprises another network device including a radio access network intelligent controller (RIC).

4. The method of claim 1, further comprising transmitting the neural network model to the network entity via a user plane protocol.

5. The method of claim 1, further comprising activating the neural network model.

6. The method of claim 5, in which the activating comprises transmitting a network model activation message from the centralized unit control plane (CU-CP) to the centralized unit machine learning plane (CU-XP), and transmitting the network model activation message from the CU-XP to the network entity.

7. The method of claim 5, further comprising activating a UE model for operation at a UE by transmitting a UE model activation message to a distributed unit (DU) for forwarding to the UE.

8. The method of claim 1, further comprising receiving a UE message from a UE triggering the configuring of the network entity.

9. The method of claim 8, in which the UE message comprises a UE assistance information message comprising the NNF ID or a model request.

10. The method of claim 1, further comprising:
  transmitting, to a UE, a prohibit timer for a UE machine learning request, in response to receiving the UE radio capability and the UE machine learning capability;
  transmitting, to the UE, a white list of allowed NNF IDs and neural network models based on the UE radio capability and the UE machine learning capability;
  transmitting, to the UE, a black list of prohibited NNF IDs and neural network models based on the UE radio capability and the UE machine learning capability; and receiving, from the UE, a request for configuring the network entity with the neural network model.

11. The method of claim 10, further comprising transmitting, to the UE, a list of events triggering the UE to report a change in conditions for initiating an update of the neural network model.

12. The method of claim 10, in which the request for configuring the network entity comprises a UE assistance information message.

13. An apparatus for wireless communication by a base station, comprising:
  a memory; and
  at least one processor coupled to the memory, the at least one processor configured:
    to receive a user equipment (UE) radio capability and a UE machine learning capability;
    to determine a neural network function (NNF) identifier (ID) based on the UE radio capability;
    to select a neural network model from a plurality of neural network models, based on the NNF ID, the UE machine learning capability, and a capability of a network entity, the neural network model comprising a model structure and a parameter set;
    to configure the network entity with the neural network model;
    to transmit, to the UE, a white list of allowed NNF IDs and neural network models based on the UE radio capability and the UE machine learning capability;
    to transmit, to the UE, a black list of prohibited NNF IDs and neural network models based on the UE radio capability and the UE machine learning capability; and
    to receive, from the UE, a request for configuring the network entity with the neural network model.

14. The apparatus of claim 13, in which the network entity comprises one or more units of the base station, including a distributed unit (DU), a centralized unit control plane (CU-CP), a centralized unit user plane (CU-UP), or a centralized unit machine learning plane (CU-XP).

15. The apparatus of claim 13, in which the network entity comprises another network device including a radio access network intelligent controller (RIC).

16. The apparatus of claim 13, in which the at least one processor is further configured:
  to transmit, from a centralized unit control plane (CU-CP) to a centralized unit machine learning plane (CU-XP), an NNF request including the NNF identifier (ID);
  to transmit a model setup request from the CU-XP to the network entity, the model setup request including a model ID corresponding to the model structure and a parameter set ID corresponding to the parameter set;
  to transmit the neural network model to the network entity based on the parameter set ID and the model ID; and
  to receive a model setup response from the network entity confirming the neural network model is configured in the network entity.

17. The apparatus of claim 16, in which the at least one processor is further configured to transmit the neural network model to the network entity via a user plane protocol.

18. The apparatus of claim 13, in which the at least one processor is further configured to activate the neural network model.

19. The apparatus of claim 18, in which the at least one processor is configured to activate by transmitting a network model activation message from a centralized unit control plane (CU-CP) to a centralized unit machine learning plane (CU-XP), and transmitting the network model activation message from the CU-XP to the network entity.

20. The apparatus of claim 18, in which the at least one processor is further configured to activate a UE model for operation at a UE by transmitting a UE model activation message to a distributed unit (DU) for forwarding to the UE.

21. The apparatus of claim 13, in which the at least one processor is further configured to receive a UE message from a UE triggering the configuring of the network entity.

22. The apparatus of claim 21, in which the UE message comprises a UE assistance information message comprising the NNF ID or a model request.

23. The apparatus of claim 13, in which the at least one processor is further configured to transmit, to the UE, a list of events triggering the UE to report a change in conditions for initiating an update of the neural network model.

24. The apparatus of claim 13, in which the request for configuring the network entity comprises a UE assistance information message.

25. The apparatus of claim 13, further comprising receiving a request for configuration based on a prohibit timer for a UE machine learning request.

* * * * *